United States Patent [19]
Watkins

[11] Patent Number: 5,655,741
[45] Date of Patent: Aug. 12, 1997

[54] PIVOTAL INSTRUMENT SUPPORT APPARATUS

[75] Inventor: Marvin C. Watkins, Cincinnati, Ohio

[73] Assignee: Liebel-Flarsheim Company, Cincinnati, Ohio

[21] Appl. No.: 405,818

[22] Filed: Mar. 16, 1995

[51] Int. Cl.⁶ .............................. A47B 1/08; F16M 3/00; F16L 19/00
[52] U.S. Cl. .................... 248/289.11; 248/282.1; 248/125.9; 403/112; 403/113; 403/117
[58] Field of Search ................... 248/282.1, 289.11, 248/125.9, 125.7; 403/164, 112, 113, 116, 117

[56]     References Cited
U.S. PATENT DOCUMENTS

| 3,550,892 | 12/1970 | Propst | 248/282.1 |
|---|---|---|---|
| 4,076,437 | 2/1978 | Mazzolla | 403/112 X |
| 4,158,511 | 6/1979 | Herbenar | 403/113 |
| 4,700,922 | 10/1987 | Gross | 248/281.1 X |
| 4,767,232 | 8/1988 | Francis | 403/113 X |
| 4,821,159 | 4/1989 | Pike | 248/282.1 X |
| 4,856,741 | 8/1989 | Schaefer | 248/282.1 X |
| 4,880,193 | 11/1989 | Warshawsky | 248/282.1 X |
| 5,181,681 | 1/1993 | Edwards | 403/113 X |
| 5,342,137 | 8/1994 | Peng | 403/117 X |
| 5,398,901 | 3/1995 | Brodmann et al. | 248/289.11 X |

*Primary Examiner*—Wynn E. Wood
*Attorney, Agent, or Firm*—Wood, Herron & Evans

[57]        ABSTRACT

A pivotal apparatus for supporting instruments beneath a patient during certain diagnostic procedures. The apparatus is adapted for pivotal locking engagement in a support member having at least one extensible and retractable mounting pin and includes an elongated shaft, a tray supported by the shaft, a latch mounted on one end of the shaft and a slide release disposed about and axially translatable along the shaft toward the latch. The mounting pin extends in a partial circumferential slot between the latch and the slide release when the apparatus is engaged in the support member whereby the apparatus pivots through a predetermined degree of rotation relative to the support member as the mounting pin travels in the slot. The apparatus is disengaged from the support member by axially translating the slide release toward the latch to urge upon and retract the mounting pin from the slot.

27 Claims, 3 Drawing Sheets

PIVOTAL INSTRUMENT SUPPORT APPARATUS

BACKGROUND OF THE INVENTION

The present invention relates generally to support apparatus for medical instruments and, more particularly, to instrument support trays which are adjustable relative to a patient during certain diagnostic procedures. The present invention has a particular but by no means exclusive relation to urological diagnostic procedures wherein instruments must be supported beneath the patient while a urologist conducts the procedure.

In one urological procedure known as an excretion urogram, a female patient is placed on a voiding stool either attached to or associated with a urological table whereby a real-time radiographic view of the patient's urinary tract is displayed on an imaging system. The patient is given contrast media intravenously, such as saline or radiopaque material, and a radiograph of the patient's lower bladder and urethral areas is taken while the patient excretes the contrast media. In this way, the urologist is provided with important information about the structure and function of the patient's kidney, ureter and bladder from the radiographic display associated with the urological table's imaging system.

It will be appreciated that as the urologist images the patient's urinary tract during the excretion urogram procedure, it is often necessary to move the patient both vertically and horizontally relative to the radiographic system. This is accomplished through electro-mechanical movement of the urological table and the associated voiding stool supporting the patient. As the excretion urogram is taking place, the urologist must typically support certain instruments beneath the patient which aid the urologist in the diagnostic procedure. Such instruments may include beakers, load scales or flow meters, for example, which provide the urologist means to check the patient's urinary volume, pressure, flow rate and duration. After the procedure is completed, a drain pan is placed beneath the patient to permit complete voiding of the patient's bladder.

In the past, such instruments and drain pans have been supported on a small foot stool, for example, which is then moved beneath the patient during the procedure. In another well known practice, a moveable intravenous (IV) stand on wheels is provided with a cantilevered tray for supporting the urological instruments beneath the patient. However, as the patient is moved on the voiding stool via the urological table, for example, the foot stools and IV stands of current instrument support practice do not move coextensively with the patient's movement. As such, the foot stools and IV stands must be continuously adjusted beneath the patient as the patient is moved during the imaging procedure.

It will further be appreciated that hospital operating rooms wherein such urological procedures take place are generally small and crowded with equipment. Thus, it is desirable to eliminate as many items in the operating room as possible where space is typically at a premium. The foot stools and IV stands, on the other hand, are additional equipment which tend to clutter the operating room and are generally difficult to move within the room due to electrical cords running along the floor. Furthermore, the foot stools cannot be vertically adjusted relative to the patient to minimize spacing between the patient and the instruments. Additionally, the IV stand may compromise the patient's safety if the patient is lowered on the voiding stool without lowering the IV stand's instrument support tray at the same time.

Accordingly, a primary objective of the present invention is to provide an improved instrument support apparatus which moves coextensively with the patient during an excretion urogram procedure and which is vertically adjustable beneath the patient to minimize spacing between the patient and the instruments.

Another objective of the present invention is to provide such an instrument support apparatus which has a predetermined degree of rotation relative to the voiding stool.

Still yet another objective of the present invention is to provide such an instrument support apparatus which is engageable and disengageable with at least one extensible and retractable mounting pin of a support member.

SUMMARY OF THE INVENTION

To these ends, the present invention is directed to an instrument support apparatus for pivotally supporting medical instruments beneath a patient during certain urological procedures. The instrument support apparatus is adapted for pivotal locking engagement in a support member having a radially extending mounting pin and provides pivotal movement of the instruments through a predetermined degree of rotation beneath the patient. The instrument support apparatus of the present invention moves coextensively with movements of the patient and is furthermore vertically adjustable relative to the patient to minimize spacing between the patient and the instruments during the urological procedure.

More particularly, the present invention includes an elongated shaft, a vertically adjustable instrument support tray supported by the shaft, and a latch mounted on one end of the shaft. The latch includes a circumferentially disposed slot which selectively receives the mounting pin when the instrument support apparatus is engaged in the support member. In this way, the shaft and, thus, the instrument support tray have a predetermined degree of rotation relative to the support member as the mounting pin travels in the receiving slot.

For mounting the instrument support apparatus on the right or left side of the voiding stool, either the shaft or the latch includes at least two indexing slots, each of which is located eccentrically relative to an axis of the shaft, and the other includes at least one inwardly extending indexing projection. The latch is angularly reversibly mountable on the shaft by alternatively locating the indexing projection in one of the indexing slots. For example, by rotating the latch 180° on the shaft in one embodiment, the instrument support apparatus can be engaged in the support member on either side of the voiding stool with the instrument support tray pivotally extending beneath the patient from either side.

In one embodiment, the mounting pin is radially extensible and retractable via a biasing spring. The instrument support apparatus further includes a slide release disposed about the shaft and axially translatable toward the latch. When the instrument support apparatus is engaged in the support member, the mounting pin extends in a slot between the latch and the slide release. In accordance with the present invention, as the slide release is axially translated toward the latch, the slide release urges upon and retracts the mounting pin from the slot such that the instrument support apparatus can be disengaged from the support member and removed.

The latch includes a tapered end which urges upon and retracts the mounting pin when the instrument support apparatus is inserted in the support member. The mounting pin remains retracted until the mounting pin reaches the slot between the latch and the slide release wherein the mounting pin extends and engages the instrument support apparatus in the support member. In this way, the mounting pin freely travels within the slot to provide pivotal locking engagement of the instrument support apparatus in the support member.

In a further embodiment, either the slide release or the mounting pin includes a tapered end. As the slide release is axially translated toward the latch, the slide release urges upon and retracts the mounting pin from the slot to disengage the instrument support apparatus from the support member. The slide release includes a radially extending annular flange for facilitating axial translation of the slide release toward the latch.

BRIEF DESCRIPTION OF THE DRAWINGS

The objections and features of the present invention will become readily apparent when the Detailed Description is taken in conjunction with the accompanying drawings in which.

DETAILED DESCRIPTION OF THE INVENTION

Figure 1:
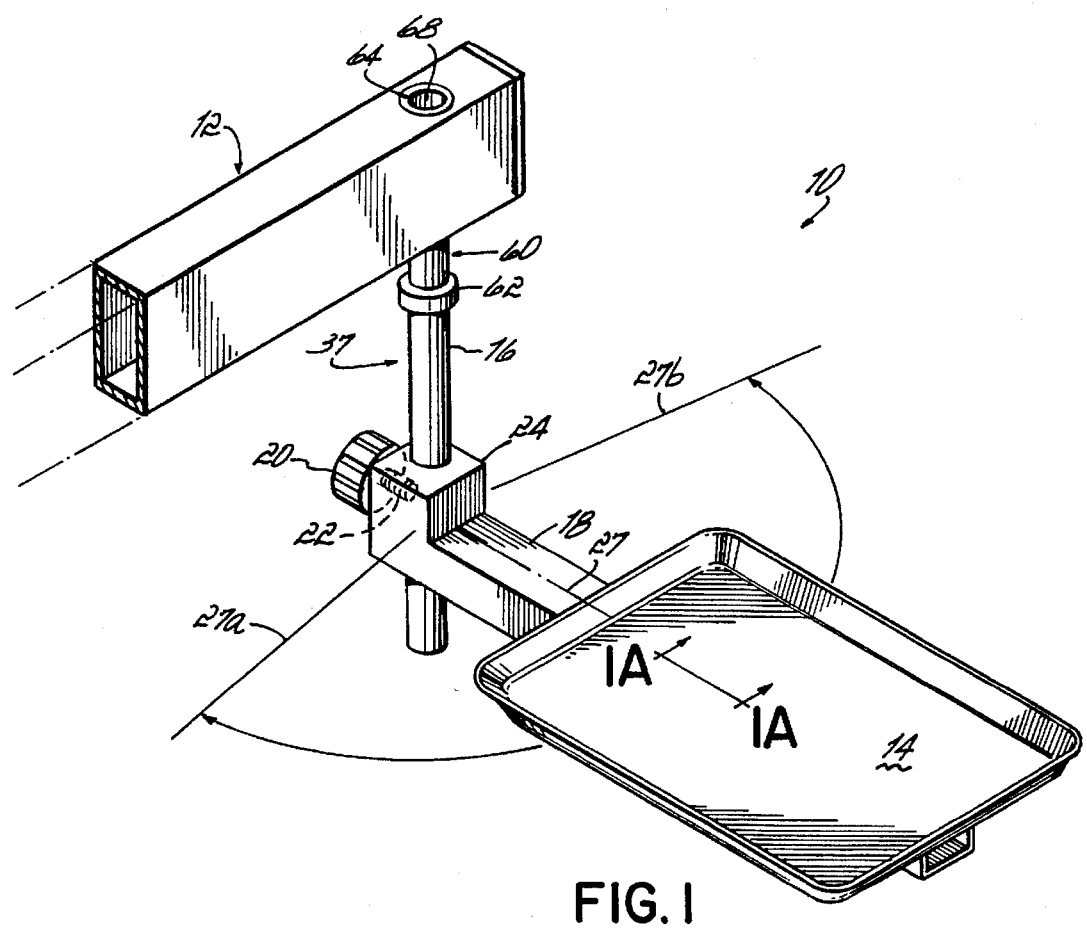
FIG. 1 is a perspective view of the present invention engaged in a support member of a voiding stool.

With reference to FIG. 1, a pivotal instrument support apparatus 10 in accordance with the present invention is shown. Instrument support apparatus 10 is adapted for pivotal locking engagement in a support member 12 of a voiding stool (not shown), for example, and includes a vertically adjustable tray 14 supported by an elongated shaft 16. Support member 12 and the associated voiding stool attach to an accessory rail of a urological table (not shown), such as Liebel-Flarsheim's HYDRAJUST®, family of urological tables, whereby the support member and voiding stool move coextensively with movements of the urological table during certain urological procedures, such as excretion urograms.

Further referring to FIG. 1, tray 14 is adapted for supporting medical instruments used during excretion urograms wherein the instruments must be supported beneath a patient on the voiding stool. Instrument support apparatus 10 is particularly adapted to provide a predetermined degree of rotation of shaft 16 and, thus, tray 14 relative to support member 12 and the voiding stool as will be described in more detail below. Tray 14 is attached to a tubular arm 18 slidably mounted on shaft 16 of instrument support apparatus 10 via an adjustable knob 20. Adjustable knob 20 includes an advanceable screw 22 through collar 24 which frictionally engages shaft 16 along an elongated axial raceway 26 (see FIG. 2) to provide vertical adjustment of tray 14. As shown in FIG. 1, tubular arm 18 has a horizontal axis 27 extending beyond support member 12.

Figure 1A:
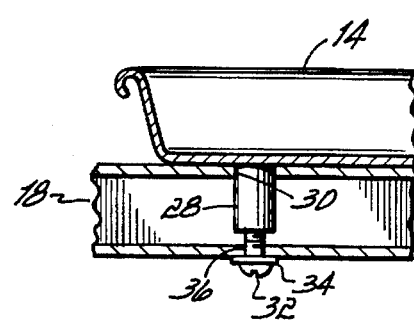
FIG. 1A is a cross-sectional view taken along lines 1A—1A of FIG. 1 showing mounting of the instrument tray.

Referring to FIG. 1A, tray 14 includes vertical standoffs 28 (one shown) which extend from tray 14 through apertures 30 in an upper side of tubular arm 18 to receive mounting screws 32. Screws 32 extend through washers 34 and aligned apertures 36 in a lower side of tubular arm 18 to removably secure tray 14 to tubular arm 18 for sterilization purposes, for example.

Figure 2:
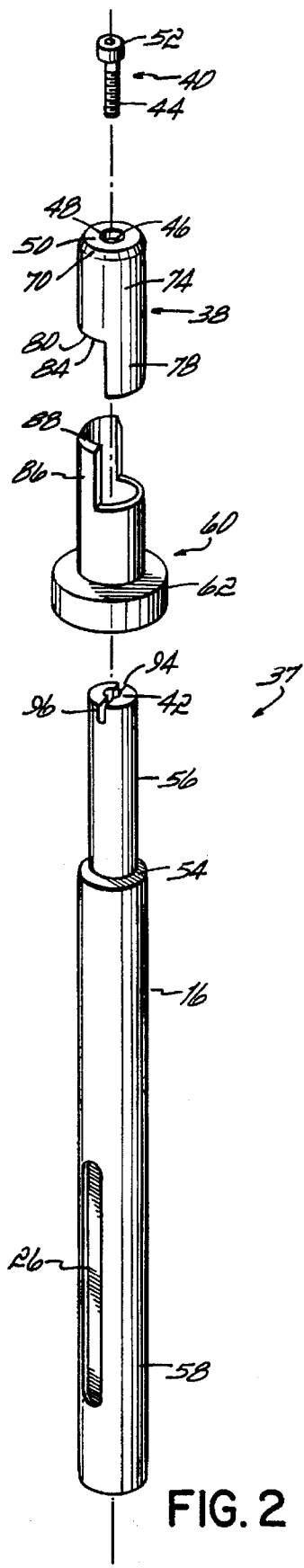
FIG. 2 an enlarged exploded view of the present invention.

With reference to FIG. 2, a support connector 37 of instrument support apparatus 10 includes a latch 38 mounted to shaft 16 via a screw 40. Elongated shaft 16 includes a threaded bore 42 for receiving screw shaft 44 of screw 40. Latch 38 includes a bore 46 and a counterbore 48 in a closed end 50 for receiving screw shaft 44 and screw head 52 of screw 40, respectively. Shaft 16 has a stepped surface 54 intermediate respective ends 56 and 58 whereby end 56 has a lesser diameter than that of end 58. A slide release 60 is slidably disposed about shaft end 56 intermediate the stepped surface 54 and the latch 38 for purposes to be described in more detail below. In one embodiment, slide release 60 includes a radially extending annular flange 62 to facilitate axial movement of slide release 60 along shaft 16 toward latch 38.

Figure 3:
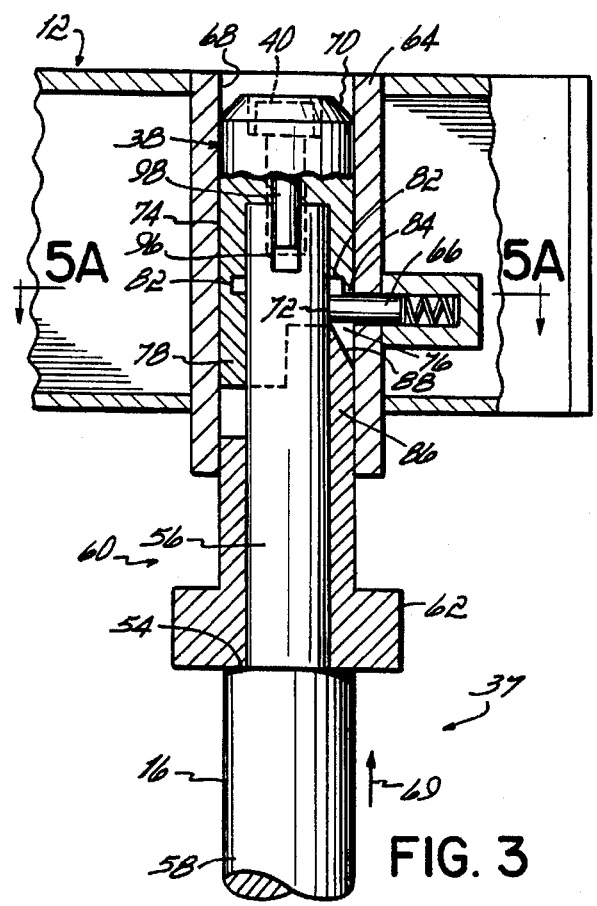
FIG. 3 is an axial cross-sectional view of the present invention engaged in the support member of FIG. 1.

As shown in FIG. 3, instrument support apparatus 10 is adapted for pivotal locking engagement in support member 12 within a tubular sleeve 64. A spring loaded mounting element of mounting pin 66 is fixed within support member 12 and extends and retracts transversely relative to shaft 16 for respectively engaging and disengaging instrument support apparatus 10 in accordance with the present invention. Mounting pin 66 is normally extended into sleeve 64 until an axial force is applied to the mounting pin 56 causing it to retract to an inner diameter 68 of sleeve 64.

As instrument support apparatus 10 is inserted into sleeve 64, as shown by directional arrow 69 in FIG. 3, a tapered edge 70 on the closed end 50 of latch 38 urges upon mounting pin 66 and cams mounting pin 66 over the tapered edge 70. In a preferred embodiment, the tapered edge 70 has a 45 degree chamfer which urges and retracts an end 72 of mounting pin 66 as instrument support apparatus 10 is inserted into sleeve 64. Latch 38 preferably has an outer diameter 74 which substantially matches the inner diameter 68 of sleeve 64. In this way, mounting pin 66 remains retracted as instrument support apparatus 10 is further inserted into sleeve 64 until mounting pin end 72 reaches a partially circumferentially disposed slot 76 between latch 38 and slide release 60. At slot 76, mounting pin end 72 extends into the inner diameter 68 of sleeve 64 such that latch 38 is thereby supported on mounting pin 66 to engage instrument support apparatus 10 in sleeve 64 of support member 12. It will be appreciated that while instrument support apparatus 10 is described and shown in the figures as depending from support member 12, a reverse orientation of apparatus 10 and support member 12 is contemplated.

With further reference to FIGS. 2 and 3, latch 38 includes a generally semi-circular tongue projection 78 which extends from an open end 80 of latch 38. Open end 80 includes a tapered inner surface 82 which is shown in FIG. 3 as a stepped surface about the open end 80. It will be appreciated that tapered inner surface 82 could likewise be a 45 degree chamfer, for example, without departing from the spirit of the present invention. Latch 38 further includes an abrupt edge 84 about the open end 80 opposite the tongue projection 78 for supporting latch 38 when mounting pin 66 is extended in slot 76 and instrument support apparatus 10 is engaged in sleeve 64.

Figure 4:
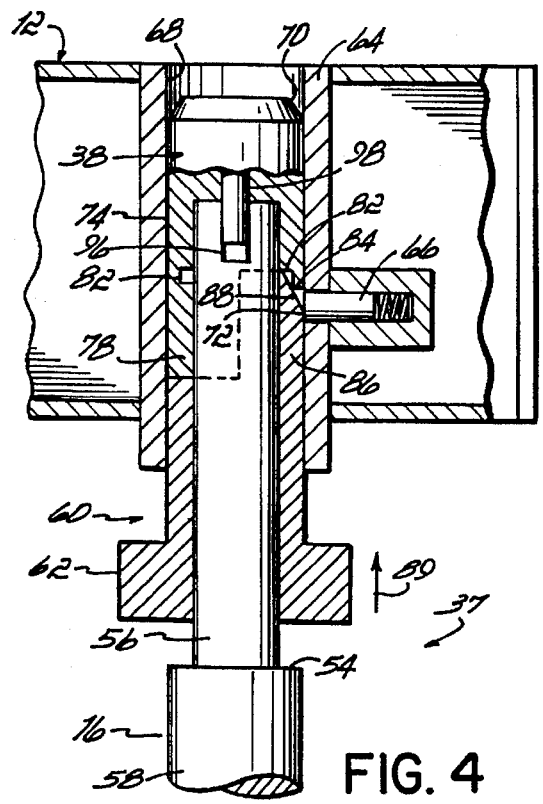
FIG. 4 is an axial cross-sectional view showing the present invention disengaged from the support member of FIG. 1.

As shown in FIGS. 2–4, slide release 60 includes a generally semi-circular tongue projection 86 at a remote end from the annular flange 62. The tongue projection 86 has a tapered end 88, such as a 45 degree chamfer, for example, which cooperates with the tapered inner surface 82 of latch 38 when the slide release 60 is axially translated along shaft 16 toward latch 38 as shown by directional arrow 89 in FIG. 4. As slide release 60 is axially translated along shaft 16 toward latch 38, tapered end 88 urges upon mounting pin end 72 and retracts mounting pin 66 substantially to the inner diameter 68 of sleeve 64 when the tapered end 88 cooperates with the tapered inner surface 82 of latch 38 (see FIG. 4). In this way, instrument support apparatus 10 is disengaged from sleeve 64 of support member 12 and can thusly be removed.

It will be appreciated that in another embodiment (not shown) mounting pin end 72 is tapered with a 45° chamfer, for example, and tapered inner surface 82 of latch 38 and tapered end 88 of slide release 60 are dispensed with. In this way, as slide release 60 is axially translated toward latch 38, tongue projection 86 urges upon and retracts mounting pin 66 as the tapered mounting pin end (not shown) cams over tongue projection 86.

Figure 5A:
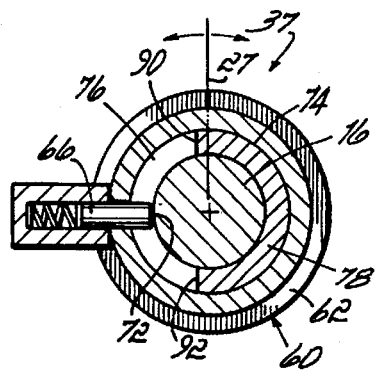
FIG. 5A is a diagrammatic cross-sectional view taken along lines 5A—5A of FIG. 3 showing the present invention engaged in the support member.
Figure 5B:
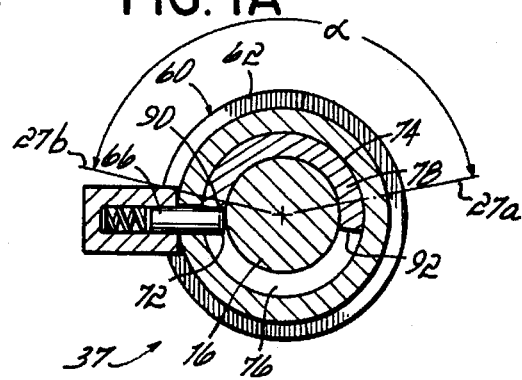
FIG. 5B is a view similar to FIG. 5A showing the present invention having a predetermined degree of rotation relative to the support member.

As shown most clearly in FIGS. 5A and 5B, when instrument support apparatus 10 is engaged in sleeve 64 and mounting pin 66 is extended in slot 76 between the abrupt edge 84 of latch 38 and the tapered end 88 of slide release 60 (see FIG. 3), shaft 16 and, thus, tray 14 have a predetermined degree of rotation relative to support member 12 as mounting pin 66 travels within slot 76. For example, and as shown in FIG. 5B, shaft 16 and associated tray 14 will travel through angle "α" between extreme tubular arm axes 27a and 27b when mounting pin 66 is extended in slot 76. Slot 76 and, thus, the predetermined degree of rotation "α" of shaft 16 and associated tray 14, are defined by respective edges 90 and 92 of tongue projection 78 such that mounting pin 66 is bound between the respective edges 90 and 92 when instrument support apparatus 10 is engaged in support member 12. In one embodiment, raceway 26 is milled at a 90° offset from a centerline of slot 76 such that as mounting pin 66 travels in slot 76 between respective edges 90 and 92, tray 14 will pivot through angle "α" with tubular arm axis 27 extending beyond support member 12 as shown in FIG. 1.

In use of instrument support apparatus 10, a urologist will install tray 14 on either a right or left side of the voiding stool to provide a patient with the most convenient access to the voiding stool (right side configuration shown in FIGS. 1, 3 and 4). As the direction which mounting pin 66 extends into sleeve 64 is fixed relative to support member 12, i.e., from the right in a right side configuration and from the left in a left side configuration, accommodation is made in instrument support apparatus 10 to permit installation of apparatus 10 on either side of the voiding stool with tray 14 extending beyond support member 12.

Figure 6:
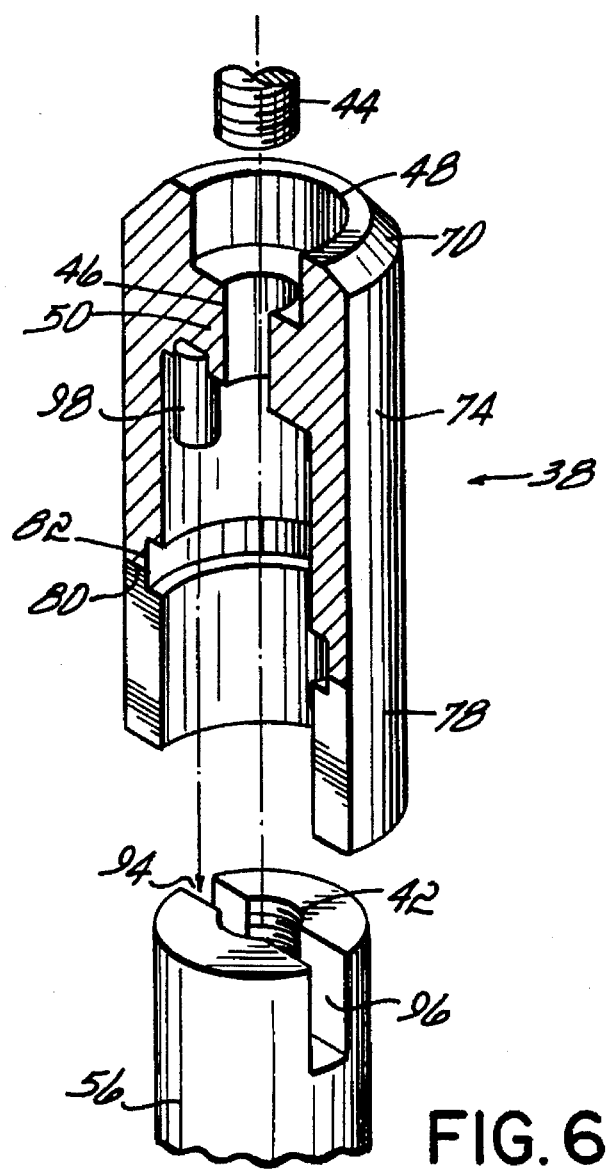
FIG. 6 is a disassembled perspective view, partially broken away, of the present invention.
Figure 7:
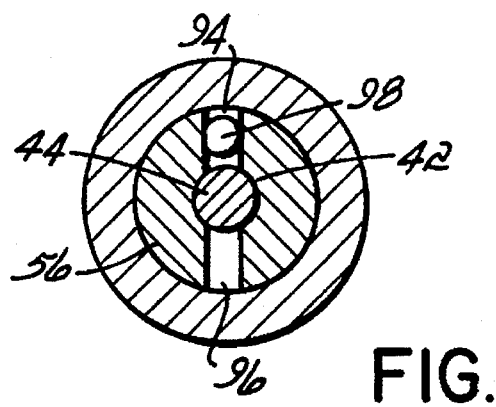
FIG. 7 is a diagrammatic cross-sectional view of the indexing projection received within one of the indexing slots.

As shown most clearly in FIGS. 2, 6 and 7, shaft 16 includes a pair of indexing slots 94 and 96 located eccentrically relative to the axis of shaft 16 and aligned across threaded bore 42 on shaft end 56. Latch 38 includes an axially extending indexing projection 98 (shown as a pin 98 in FIG. 6) welded or otherwise attached to closed end 50 such that indexing projection or pin 98 alternatively extends into one or the other of respective indexing slots 94 and 96 when latch 38 is mounted on shaft 16. In this way, instrument support apparatus 10 can be switched from one side of the voiding stool to the other side by simply removing latch 38 from shaft 16 via screw 40, rotating latch 38 180° until the indexing projection 98 is received in the opposite indexing slot 94 or 96 and remounting latch 38 on the shaft 16. Instrument support apparatus 10 is thus ready to be re-engaged in support member 12 on the opposite side of the voiding stool with tray 14 extending beyond support member 12.

It will be appreciated that axially extending indexing projection 98 could be dispensed with and replaced with at least one radially inwardly extending indexing projection (not shown) which alternatively extends into one or the other of respective indexing slots 94 and 96. While a pair of indexing slots 94 and 96 have been shown and described on the shaft end 56, the present invention contemplates a plurality of indexing slots (not shown) circumferentially disposed about shaft end 56. Additionally, one skilled in the art will recognize that indexing slots 94 and 96 of shaft end 56 could be reversed with indexing projection 98 of latch 38 without departing from the spirit of the present invention.

During the excretion urogram procedure, the urologist will support instruments, including beakers, load scales, flow meters and drain pans, for example, on tray 14 and then pivot tray 14 beneath the patient on the voiding stool. The urologist will further vertically adjust tray 14 relative to the voiding stool along raceway 26 via adjustable knob 20 and advanceable screw 22 to minimize spacing between the patient and the instruments. As the urologist moves the urological table during the excretion urogram procedure, the support member 12 and, thus, instrument support apparatus 10 will move coextensively with movements of the table. After the procedure is completed, tray 14 is then pivoted from beneath the voiding stool and the instruments are removed. It will be appreciated that instrument support apparatus 10 can be readily disengaged from support member 12 and disassembled for sterilization as required. It will further be appreciated that, while the present invention has been described in detail with relation to urological procedures, the present invention contemplates any environment wherein it is desirable to support instruments or the like on a pivotal support tray.

From the above disclosure of the general principles of the present invention and the preceding detailed description of a preferred embodiment, those skilled in the art will readily comprehend the various modifications to which the present invention is susceptible without departing from the scope of the present invention. Therefore, Applicant desires to be limited only by the scope of the following claims and equivalents thereof.

What is claimed is:

1. An instrument support apparatus in combination with a support member having at least one radially extending mounting element for locking engagement with said instrument support apparatus, said instrument support apparatus comprising:

an elongated shaft;

an instrument support device supported by said shaft; and a latch mounted on one end of said shaft, said latch including a partially circumferentially disposed slot for selectively receiving said mounting element when said instrument support apparatus is engaged in said support member, said shaft having a predetermined degree of rotation relative to said support member as said mounting element travels in said slot, one of said shaft and said latch including at least two indexing slots, each of said indexing slots being located eccentrically relative to an axis of said shaft, and the other of said shaft and said latch including at least one inwardly extending indexing projection, said indexing projection being alternatively received within one of said indexing slots whereby said latch is angularly reversibly mountable on said shaft by alternatively locating said indexing projection in one of said indexing slots.

2. The instrument support apparatus of claim 1 wherein said mounting element is radially extensible and retractable, said instrument support apparatus further including a slide release disposed about said shaft and axially translatable along said shaft toward said latch, said mounting element being operable to extend in said slot between said latch and said slide release when said instrument support apparatus is engaged in said support member and said mounting element is extended, said slide release being operable to urge upon and retract said mounting element when said slide release is axially translated toward said latch whereby said instrument support apparatus can be disengaged from said support member.

3. The instrument support apparatus of claim 1 wherein said latch is supported by said mounting element.

4. The instrument support apparatus of claim 1 wherein said instrument support device is axially adjustable along said shaft.

5. The instrument support apparatus of claim 2 wherein said slide release includes a radially extending annular flange for facilitating axial translation of said slide release toward said latch.

6. The instrument support apparatus of claim 2 wherein said latch includes a tapered end which urges upon and retracts said mounting element when said instrument support apparatus is inserted in said support member.

7. The instrument support apparatus of claim 2 wherein one of said slide release and said mounting element includes a tapered end, said mounting element being operable to retract as said slide release is axially translated toward said latch whereby said instrument support apparatus is disengaged from said support member.

8. An instrument support apparatus in combination with a support member having at least one radially extensible and retractable mounting element for locking engagement with said instrument support apparatus, said instrument support apparatus comprising:

an elongated shaft;

an instrument support device supported by said shaft;

a latch mounted on said shaft; and a slide release disposed about said shaft and axially translatable along said shaft, said mounting element being operable to extend in a partial circumferential slot between said latch and said slide release when said instrument support apparatus is engaged in said support member and said mounting element is extended, said slide release being operable to urge upon and retract said mounting element when said slide release is axially translated toward said latch whereby said instrument support apparatus can be disengaged from said support member and removed.

9. The instrument support apparatus of claim 8 wherein said shaft has a predetermined degree of rotation relative to said support member as said mounting element travels in said slot, said instrument support device having the same predetermined degree of rotation relative to said support member as said shaft.

10. The instrument support apparatus of claim 8 wherein said latch is supported by said mounting element when said instrument support apparatus is engaged in said support member and said mounting element is extended.

11. The instrument support apparatus of claim 8 wherein said slide release includes a radially extending annular flange for facilitating axial translation of said slide release toward said latch.

12. The instrument support apparatus of claim 8 wherein said latch includes a tapered end which urges upon and retracts said mounting element when said instrument support apparatus is inserted in said support member.

13. The instrument support apparatus of claim 8 wherein one of said slide release and said mounting element includes a tapered end, said mounting element being operable to retract as said slide release is axially translated toward said latch whereby said instrument support apparatus is disengaged from said support member.

14. The instrument support apparatus of claim 8 wherein one of said shaft and said latch includes at least two indexing slots, each of said indexing slots being located eccentrically relative to an axis of said shaft, and the other of said shaft and said latch including at least one inwardly extending indexing projection, said indexing projection being alternatively received within one of said indexing slots whereby said latch is angularly reversibly mountable on said shaft by alternatively locating said indexing projection in one of said indexing slots.

15. The instrument support apparatus of claim 8 wherein said instrument support device is axially adjustable along said shaft.

16. An instrument support apparatus in combination with a support member having at least one radially extensible and retractable mounting element for locking engagement with said instrument support apparatus, the instrument support apparatus comprising:

an elongated stepped shaft having ends of different diameter;

a latch disposed about one end of said shaft, said latch having a closed end attached to said one end of said shaft, said latch further having a remote open end with a tongue projection disposed opposite an abrupt surface thereof, said abrupt surface including a tapered inner surface, and a slide release disposed about said one end of said shaft, said slide release being axially translatable along said one end of said shaft intermediate a remote end of said shaft and said latch, said slide release having a tongue projection extending toward said latch wherein said tongue projection includes a tapered end which cooperates with said tapered inner surface when said slide release is axially translated toward said latch, said mounting element extending in a partial circumferential slot between said abrupt surface and said tapered end whereby said latch is supported by said mounting element when said instrument support apparatus is engaged by said mounting element, said tapered end urging upon and retracting said mounting element when said slide release is axially translated toward said latch whereby said instrument support apparatus is disengaged from said mounting element.

17. The instrument support apparatus of claim 16 wherein said shaft has a predetermined degree of rotation relative to said mounting element as said mounting element travels in said slot, said instrument support device having the same predetermined degree of rotation relative to said mounting element as said shaft.

18. The instrument support apparatus of claim 16 wherein said slide release includes a radially extending annular flange for facilitating axial translation of said slide release toward said latch.

19. The instrument support apparatus of claim 16 wherein said latch includes a tapered end which urges upon and retracts said mounting element until said instrument support apparatus is engaged by mounting element.

20. The instrument support apparatus of claim 16 wherein said shaft includes at least two indexing slots, each of said indexing slots being located eccentrically relative to an axis of said shaft, said latch including an inwardly extending indexing pin which is alternatively received within one of said slots whereby said latch is angularly reversibly mountable on said shaft by alternatively locating said indexing pin in one of said indexing slots.

21. The instrument support apparatus of claim 16 wherein said instrument support device is axially adjustable along said shaft.

22. An instrument support apparatus in combination with a support member having at least one radially extending mounting element for locking engagement with said instrument support apparatus, said instrument support apparatus comprising:

an elongated shaft;

an instrument support device supported by said shaft; and a latch mounted on one end of said shaft, said latch including a partially circumferentially disposed slot for selectively receiving said mounting element when said instrument support apparatus is engaged in said support member, said shaft having a predetermined degree of rotation relative to said support member as said mounting element travels in said slot.

23. An instrument support apparatus in combination with a support member having at least one radially extending mounting pin for locking engagement with said instrument support apparatus, said instrument support apparatus comprising:

an elongated shaft;

a tray supported by said shaft; and a latch mounted on one end of said shaft, said latch including a partially circumferentially disposed slot for selectively receiving said mounting pin when said instrument support apparatus is engaged in said support member; and a slide release disposed about said shaft and axially translatable along said shaft toward said latch, said mounting pin being operable to extend in said slot and between said latch and said slide release when said instrument support apparatus is engaged in said support member and said mounting pin is extended, said slide release being operable to urge upon and retract said mounting pin when said slide release is axially translated toward said latch whereby said instrument support apparatus can be disengaged from said support member.

24. The instrument support apparatus of claim 1 wherein said mounting element comprises an elongated pin.

25. The instrument support apparatus of claim 1 wherein said instrument support device comprises a tray.

26. The instrument support apparatus of claim 8 wherein said mounting element comprises an elongated pin.

27. The instrument support apparatus of claim 8 wherein said instrument support device comprises a tray.

* * * * *